No. 754,483. PATENTED MAR. 15, 1904.
C. H. MUSTGROVE.
HARNESS RACK.
APPLICATION FILED JUNE 16, 1903.
NO MODEL.
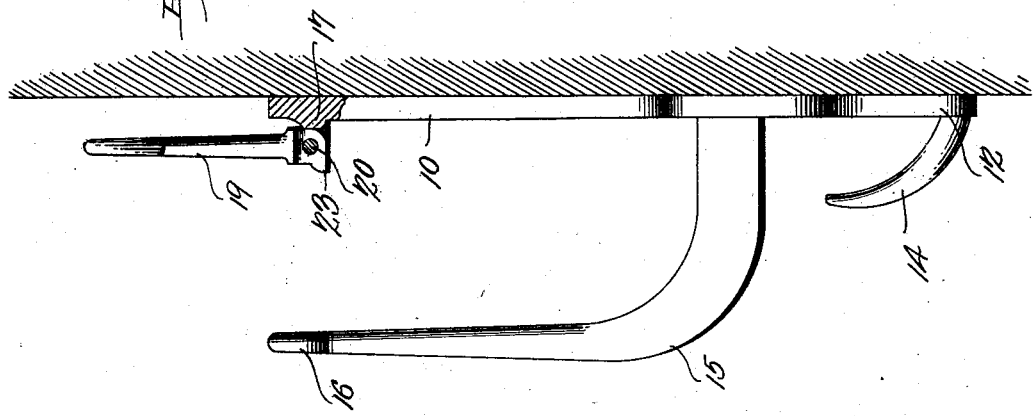
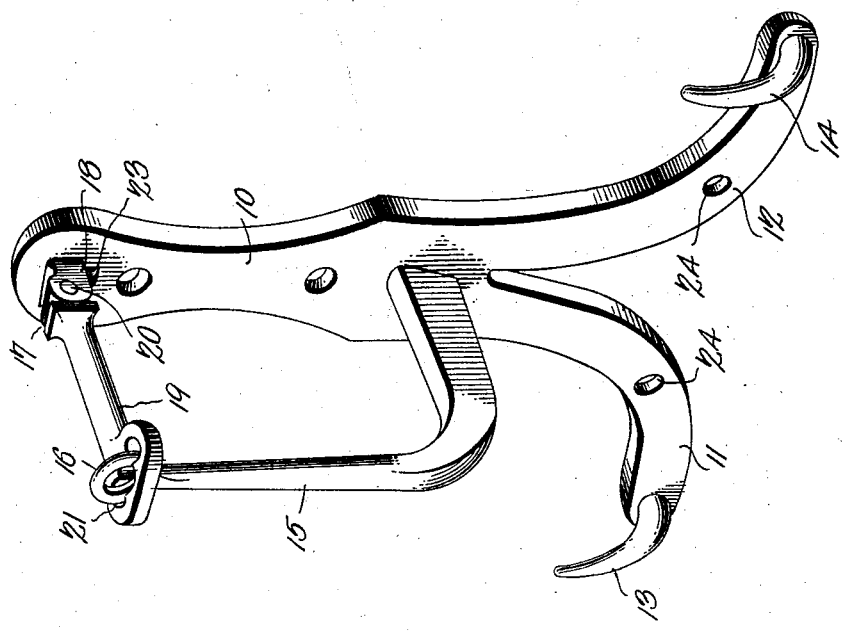
Witnesses
E. F. Stewart
C. N. Woodward
C. H. Mustgrove, Inventor.
by C. A. Snow & Co.
Attorneys No. 754,483.

Patented March 15, 1904.

UNITED STATES PATENT OFFICE.

CHARLES HURBERT MUSTGROVE, OF COLORADO SPRINGS, COLORADO.

HARNESS-RACK.

SPECIFICATION forming part of Letters Patent No. 754,483, dated March 15, 1904.

Application filed June 16, 1903. Serial No. 161,742. (No model.)

*To all whom it may concern:*

Be it known that I, CHARLES HURBERT MUSTGROVE, a citizen of the United States, residing at Colorado Springs, in the county of El Paso and State of Colorado, have invented a new and useful Harness-Rack, of which the following is a specification.

This invention relates to devices from which articles of various kinds may be suspended, but which is more particularly applicable to the suspension of harness, the object being to provide a device of this class whereby harness when not in use may be supported in a position with the separate pieces occupying certain definite hooks in a convenient position for handling to materially reduce the time necessary to place the harness upon the horse when it is to be harnessed.

Another object of the invention is to simplify and improve devices of this general class and produce a device which may be cheaply constructed and which will be durable and efficient in use; and with this end in view the invention consists in certain novel features of construction, as hereinafter shown and described, and specified in the claim.

In the drawings illustrative of the invention, in which corresponding parts are denoted by like designating characters, Figure 1 is a perspective view, and Fig. 2 is a side elevation.

The improved device consists of a supporting or base frame formed of a body portion 10, bifurcated at its lower end, with the members 11 12 curved laterally in opposite directions and having upwardly-turning hooks 13 14, and the body portion is provided with a central upwardly-turned hook 15, terminating in an eye 16. The hook 15 is preferably made L-shaped, with its short arm secured to the body portion and its long arm extended in a plane parallel with the body portion.

Extending from the upper part of the body portion 10 are spaced ears 17 18, between which an arm 19 is movably secured by a pivot 20, the outer free end of the arm terminating in an aperture 21, adapted when lowered to pass over the eye on the upper end of the hook 15, as shown in Fig. 1, the eye 16 projecting through the opening 21 and extending above the arm 19 to provide means for the insertion of the bolt of a padlock or other securing means. The arm 19 is provided with a stop 23, which extends below the ears 17 18 when the arm is in its depressed position to limit the downward movement and prevent the arm falling below a horizontal plane.

The members 10 11 12 will be provided with apertures 24 to receive the holding-screws by which the device may be attached to a wall or post.

By this simple means the different parts of a harness may be "hung up" on the respective hooks in a convenient manner and maintained in such a position that it can be readily "taken down" and expeditiously handled when it is to be placed upon the horse. Thus no confusion or entangling of the different parts of the harness will occur; but the parts may be each suspended from its own hook and the harness locked fast to the device when desired.

While the device, as before stated, is more particularly designed for supporting harness, it may be employed for other purposes, and I do not, therefore, wish to be limited in the use of the device for any specific purpose, but reserve the right to its use for any purpose for which it is adapted.

The frame and hooks and the ears 17 18 will preferably be formed integral of any suitable metal and may be plated, japanned, or otherwise ornamented or protected and of any size desired to adapt the device to the purposes required.

Having thus described the invention, what I claim is—

A device of the class described comprising a supporting-frame, a hook extending from said frame, and an arm pivotally connected with said frame and having a depending lug at its pivoted end disposed in position to engage said frame to limit the movement of said arm in a downward direction, said hook and arm being provided at their free ends with interengaging means.

In testimony that I claim the foregoing as my own I have hereto affixed my signature in the presence of two witnesses.

CHARLES HURBERT MUSTGROVE.

Witnesses:
H. BERTRAM FARR,
ALEX EHRENFELD.